(12) United States Patent
Kim

(10) Patent No.: US 11,268,527 B2
(45) Date of Patent: Mar. 8, 2022

(54) COOLING FAN

(71) Applicant: AMOTECH CO., LTD., Incheon (KR)

(72) Inventor: Byung Soo Kim, Anyang-si (KR)

(73) Assignee: AMOTECH CO., LTD., Incheon (KR)

( * ) Notice: Subject to any disclaimer, the term of this patent is extended or adjusted under 35 U.S.C. 154(b) by 116 days.

(21) Appl. No.: 16/652,222

(22) PCT Filed: Nov. 29, 2018

(86) PCT No.: PCT/KR2018/014964
§ 371 (c)(1),
(2) Date: Mar. 30, 2020

(87) PCT Pub. No.: WO2019/112245
PCT Pub. Date: Jun. 13, 2019

(65) Prior Publication Data
US 2020/0291949 A1 Sep. 17, 2020

(30) Foreign Application Priority Data

Dec. 6, 2017 (KR) .......................... 10-2017-0166772

(51) Int. Cl.
*F04D 25/06* (2006.01)
*F04D 19/00* (2006.01)
*F04D 27/00* (2006.01)

(52) U.S. Cl.
CPC ........... *F04D 25/06* (2013.01); *F04D 19/002* (2013.01); *F04D 27/001* (2013.01); *F05B 2270/101* (2013.01); *F05B 2270/809* (2013.01)

(58) Field of Classification Search
CPC ................................ F04D 25/06; F04D 19/002
See application file for complete search history.

(56) References Cited

U.S. PATENT DOCUMENTS

| 5,925,948 A * | 7/1999 | Matsumoto | ............ | H02K 29/08 310/67 R |
| 7,230,356 B2 * | 6/2007 | Kimura | .................. | H02K 29/08 310/68 B |

(Continued)

FOREIGN PATENT DOCUMENTS

| JP | 08242569 | 9/1996 |
| JP | 2001069738 | 3/2001 |

(Continued)

OTHER PUBLICATIONS

International Search Report—PCT/KR2018/014964 dated Feb. 22, 2019.

*Primary Examiner* — Patrick Hamo
(74) *Attorney, Agent, or Firm* — Cantor Colburn LLP

(57) ABSTRACT

A cooling fan includes: a fan housing; a rotation shaft rotatably supported in the fan housing; a stator fixed to the fan housing; a rotor, which is provided with a magnet that is disposed with a predetermined gap away from the outer circumferential surface of the stator, and which has an impeller connected thereto; and a printed circuit board (PCB) which is installed on a lower side of the stator, and is equipped with a circuit component for controlling the cooling fan and a Hall sensor for sensing the revolutions of the rotor. In order to increase the sensing power of the Hall sensor, the magnet is formed such that the length or the width of the magnet at the lower part thereof that is adjacent to the Hall sensor is larger than that of the other parts of the magnet.

4 Claims, 3 Drawing Sheets

(56) References Cited

U.S. PATENT DOCUMENTS

2015/0157778 A1* 6/2015 Ishiyama .............. A61M 60/50
600/16
2021/0288531 A1* 9/2021 Takahashi ................ H02K 3/47

FOREIGN PATENT DOCUMENTS

| JP | 2016189672 | 11/2016 |
| KR | 101039635 | 6/2011 |
| KR | 101078386 | 10/2011 |
| KR | 101482939 | 1/2015 |

* cited by examiner

COOLING FAN

TECHNICAL FIELD

The present invention relates to a cooling fan for preventing overheating of electronic devices, automobiles, LED lightings or the like.

BACKGROUND ART

Cooling fans are mainly used to prevent overheating of various electronic devices, LED lights, or various components mounted in automobiles.

A cooling fan includes a rotary shaft rotatably supported in a fan housing, a rotor fixed to the rotary shaft, a stator fixed to the fan housing and disposed with a predetermined gap from the rotor, an impeller fixed to the rotor and rotating with the rotor, and a printed circuit board (PCB) installed under the stator to control the cooling fan.

The cooling fan is equipped with a Hall sensor that measures the number of revolutions of the rotor, and the Hall sensor measures the number of revolutions of the rotor by sensing a magnetic field generated by a magnet, and is disposed as close as possible to the magnet.

The Hall sensor of the motor is mounted on a Hall sensor substrate, as disclosed in Korean Patent No. 10-1482939 (published on Jan. 6, 2015), and the Hall sensor substrate is installed on one side of an insulator to which the stator is fixed and is electrically connected to a motor main board by a cable.

Since the Hall sensor is a structure that is installed at a location close to the magnet separately from the main board controlling the motor and connected to the main board, the configuration is complicated and manufacturing costs increase.

In addition, even when the Hall sensor is installed on the main board, the Hall sensor is mounted on the upper surface of the main board, that is, at a position facing the magnet, so that the Hall sensor can be installed close to the magnet, and various circuit components are mounted on the rear surface of the main board.

In this case, since there are two processes including the process of mounting circuit components on the rear surface of the main board and the process of mounting the Hall sensor on the top surface of the main board, the number of the manufacturing processes increases and the manufacturing costs increase.

DISCLOSURE

Technical Problem

It is an object of the present invention to provide a cooling fan capable of improving a sensing force of a Hall sensor by increasing the strength of a magnetic field transmitted to the Hall sensor of a magnet.

It is another object of the present invention to provide a cooling fan capable of shortening a manufacturing process and reducing manufacturing costs by allowing circuit components and a Hall sensor to be mounted together on one surface of a printed circuit board (PCB).

Technical Solution

A cooling fan according to the present invention comprises: a fan housing; a rotation shaft which is rotatably supported in the fan housing; a stator which is fixed to the fan housing; a rotor, which is provided with a magnet that is disposed with a predetermined gap away from an outer circumferential surface of the stator and a back yoke disposed on the outer circumferential surface of the magnet and that is installed on the rotation shaft; and a printed circuit board (PCB) which is installed on a lower side of the stator, and is equipped with a circuit component for controlling the cooling fan and a Hall sensor for sensing the revolutions of the rotor, wherein a sensing power enhancement unit for enhancing the sensing power of the Hall sensor may be formed in the magnet such that any one of the length and the width at the lower portion of the magnet that is adjacent to the Hall sensor is larger than that of the other parts of the magnet.

The PCB may be equipped with circuit components and a Hall sensor on one side of the PCB by a single process of mounting components.

The sensing power enhancement unit may include an expansion portion having an increased thickness at a lower portion of the magnet to increase the strength of a magnetic field directed downward.

The magnet may be formed in a cylindrical shape, and the expansion portion may protrude and be formed in a circumferential direction on a lower outer surface of the magnet.

The expansion portion may protrude to a width equal to the thickness of the back yoke.

The sensing power enhancement unit may include a protrusion portion that protrudes and is formed in a downward direction of the magnet to increase the length of the magnet.

The protrusion portion may be formed thinner than the thickness of other parts of the magnet.

The protruding portion may include an inclined surface formed to become thinner as it goes downward in the inner surface of the magnet so that the magnet is formed thinner than the thickness of other parts of the magnet.

Advantageous Effects

As described above, in the present invention, the lower area of the magnet is formed large to increase the strength of the magnetic field generated in the lower portion close to the Hall sensor, and to improve the sensing performance of the Hall sensor.

In addition, by increasing the strength of the magnetic field that can be sensed by the Hall sensor, circuit components and Hall sensors can be mounted on the rear surface of the PCB together, and accordingly, the cooling fan can be manufactured by a single process of mounting components, thereby shortening the manufacturing process and reducing manufacturing costs.

BEST MODE

Figure 1:
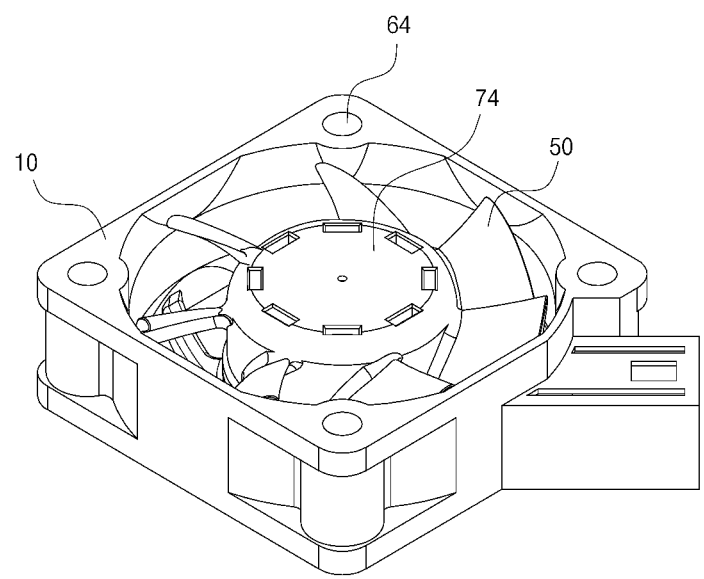
FIG. 1 is a perspective view of a cooling fan according to an embodiment of the present invention.

Hereinafter, embodiments of the present invention will be described in detail with reference to the accompanying drawings. The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

Figure 2:
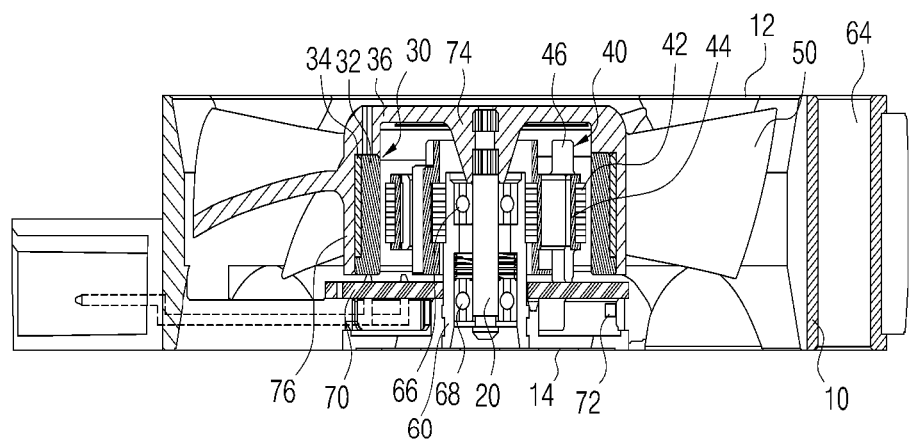
FIG. 2 is a cross-sectional view of a cooling fan according to an embodiment of the present invention.

Referring to FIGS. 1 and 2, a cooling fan according to an embodiment of the present invention includes: a fan housing 10 in which an air discharge port 12 through which air is discharged is formed on a front side of the fan housing 10, and an air inlet port 14 through which air is introduced into a rear surface thereof; a rotary shaft 20 rotatably supported by the fan housing 10; a rotor 30 fixed to the rotary shaft 20; a stator 40 fixed to the fan housing 10 and disposed at a predetermined gap from the rotor 30; an impeller 50 connected to the rotor 30 and rotating together with the rotor 30; and a printed circuit board (PCB) 70 disposed on a lower side of the rotor 30 and the stator 40 to connect electric power to the stator 40 wherein various circuit components for controlling the cooling fan are mounted on the PCB 70.

The fan housing 10 has a front surface and a rear surface open to allow air to pass through, and a support portion 60 to which the stator 40 is fixed and which is formed in the center of the fan housing 10, while the rotary shaft 20 is rotatably supported in the center thereof.

Fastening holes 64 for fixing a mounting bracket on which a cooling fan is mounted are formed at the corners of the fan housing 10.

The support portion 60 is formed in a cylindrical shape in the center of the fan housing 10, and on the inner surface of which the rotary shaft 20 is rotatably inserted, and on the outer surface of which the stator 40 is fixed.

The rotary shaft 20 is rotatably supported by bearings 66 and 68 on the inner surface of the support portion 60. The bearings 66 and 68 include a first ball bearing 66 rotatably supporting an upper portion of the rotary shaft, and a second ball bearing 68 rotatably supporting a lower portion of the rotating shaft 20.

The stator 40 includes a stator core 42 fixed to the outer circumferential surface of the support portion 60, a bobbin 44 mounted on the outer surface of the stator core 42, and a coil 46 wound around the bobbin 44 and through which electric power is applied.

The rotor 30 is disposed with a certain gap on the outer circumferential surface of the stator 40 and includes a magnet 32 formed in a cylindrical shape, a back yoke 34 disposed on the outer circumferential surface of the magnet 32, and a rotor support 36 to which the magnet 32 and the back yoke 34 are fixed and the impeller 50 is connected.

The rotor support 36 includes a disk portion 74 having a rotary shaft 20 connected to the center thereof and formed in a disk shape, and a cylindrical portion 76 vertically extending from the edge of the disk portion 74, and on the inner surface of which the magnet 32 and the back yoke 34 are fixed, and on the outer surface of which the impeller 50 is formed.

The impeller 50 is integrally formed with the rotor support 36 on the outer circumferential surface of the rotor support 36. That is, the impeller 50 and the rotor support 36 are formed by performing insert injection while the magnet 32, the back yoke 34, and the rotary shaft 20 are disposed in a mold, and the rotary shaft 20, the magnet 32 and the back yoke 34 are fixed on the rotor support 36.

The PCB 70 is disposed on the lower side of the stator 40, is opened in the center thereof and formed in a disk shape inserted into the outer surface of the support portion 60, and is fixed to the fan housing 10.

Various circuit components for controlling a blower fan are mounted on the PCB 70, the coil 46 of the stator 40 is electrically connected to the PCB 70, and a Hall sensor 72 for measuring the number of revolutions of the rotor 30 is mounted on the PCB 70.

In the case of a conventional PCB, circuit components are mounted on the back surface of the PCB 70 to avoid interference with the stator 40 or the rotor 30, and a Hall sensor is mounted on the upper surface of the PCB to be close to the magnet to increase sensing power. In other words, since the Hall sensor detects the magnetic field of the magnet and measures the number of revolutions of the rotor, the closer it is to the magnet, the easier it is to detect the magnetic field. Therefore, the Hall sensor is mounted on the upper surface of the PCB installed near the magnet, or a separate PCB on which the Hall sensor is mounted is installed at a position close to the magnet.

When mounting circuit components on a PCB, a Surface Mounting Device (SMD) is used. When the circuit components are mounted on the back of the PCB and the Hall sensor is mounted on the upper surface of the PCB, two processes including the process of mounting the circuit components and the process of mounting the Hall sensor should be performed. That is, since two processes are required, manufacturing time and cost are increased.

In the present invention, the circuit components and the Hall sensor 72 are mounted together on the back surface of the PCB 70 so that they can be installed on the PCB 70 in a single process. Any one of the thickness and length on the lower side of the magnet 32 which is disposed adjacent to the Hall sensor is made to be larger than that of the other parts thereof. A sensing power enhancement unit is formed to increase the strength of the magnetic field so that the Hall sensor 72 mounted on the back surface of the PCB 70 can sufficiently sense the number of revolutions of the rotor.

Figure 3:
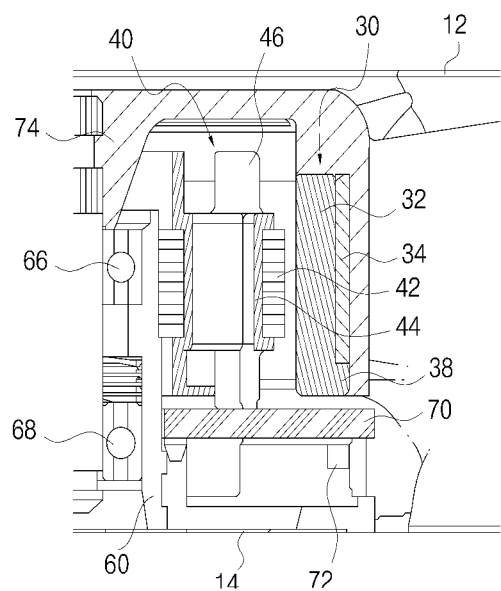
FIG. 3 is a partially enlarged cross-sectional view of a cooling fan according to an embodiment of the present invention.
Figure 4:
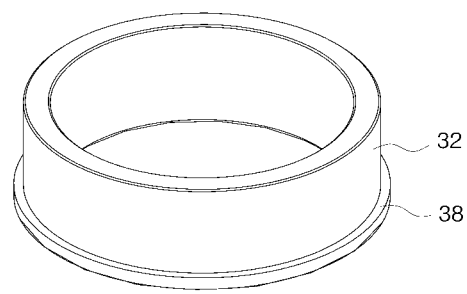
FIG. 4 is a perspective view of a magnet according to an embodiment of the present invention.

The magnet 32 according to an embodiment is formed in a cylindrical shape, as illustrated in FIGS. 3 and 4, and a sensing power enhancement unit is formed at the bottom of the magnet 32.

The sensing power enhancement unit according to an embodiment includes an expansion portion 38 which protrudes outwardly to the lower outer surface of the magnet 32 to increase the strength of the magnetic field toward the downward direction of the magnet 32 by making the lower thickness of the magnet 32 larger than that of other parts thereof.

The magnet 32 is formed of a plastic magnet. That is, the lower portion of the magnet 32 should be formed with an expansion portion 38 protruding outwardly. If a plastic magnet is used for the magnet, the expansion portion 38 can be integrally molded in a mold with the magnet 32, and thus the manufacturing cost can be reduced.

The expansion portion 38 of the magnet 32 protrudes outwardly of the magnet 32 and is formed thicker than the thickness of other parts of the magnet 32 to increase the strength of the magnetic field.

In addition, the expansion portion 38 is preferably formed to have the same thickness as the back yoke 34 so that there is no portion protruding outward. A magnetic field leakage portion may be formed on the outer surface of the expansion portion 38 so that the magnetic field leaks outwardly of the expansion portion 38 by removing the back yoke 34.

The magnetic field leakage portion increases the strength of the magnetic field and increases the sensing power of the Hall sensor 72 by allowing the magnetic field generated by the sensing power enhancement unit to leak outwardly of the magnet 32.

Figure 5:
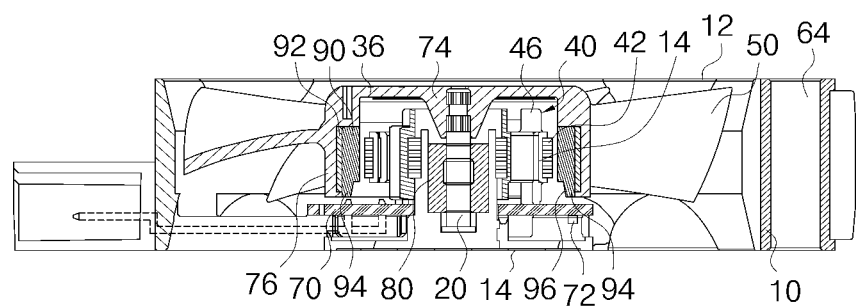
FIG. 5 is a cross-sectional view of a cooling fan provided with a magnet according to another embodiment of the present invention.
Figure 6:
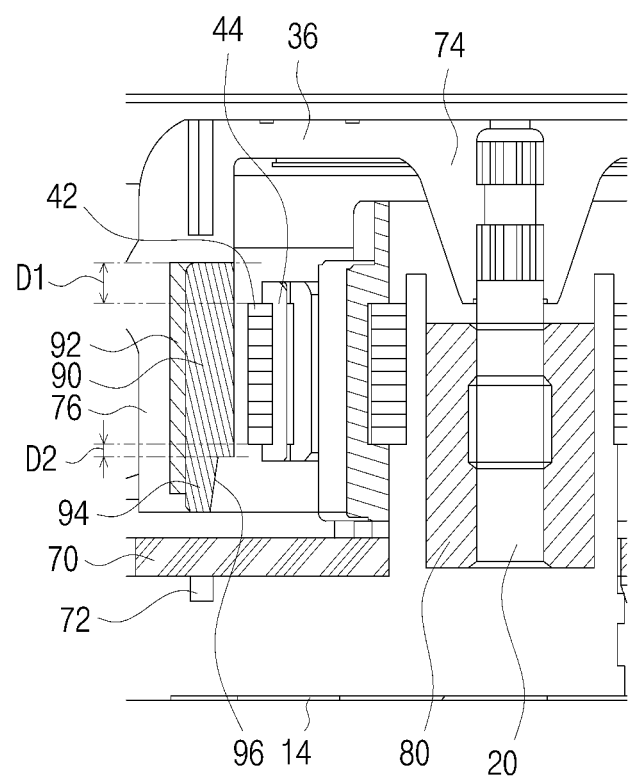
FIG. 6 is a partially enlarged cross-sectional view of a cooling fan provided with a magnet according to another embodiment of the present invention.

Referring to FIGS. 5 and 6, a cooling fan according to another embodiment of the present invention has the same structure as the cooling fan described in the above-described embodiment, and a magnet 90 has a structure different from the magnet 32 of the above-described embodiment.

The sensing power enhancement unit according to another embodiment is a protruding portion 94 that protrudes in the downward direction of the magnet and increases the length of the magnet 90 to increase the strength of the magnetic field toward the downward direction of the magnet 90.

That is, the area of the magnet 90 is increased by causing the lower portion of the magnet 90 to protrude downward, and the strength of the magnetic field directed toward the downward direction of the magnet 90 is increased by an increase in the area of the magnet 90. Therefore, the Hall sensor 72 mounted on the rear surface of the PCB 70 makes it possible to easily sense the magnetic field of the magnet 90.

The magnet 90 according to this embodiment is preferably formed of a neodymium (Nd) magnet. The ND magnet is manufactured by sintering neodymium, iron, boron, and the like, and when the magnet 90 is sintered, the protruding portion 94 is integrally molded with the magnet 90.

The thickness of the protruding portion 94 is formed thinner than the thickness of other parts of the magnet 90. That is, an inclined surface 96 is formed on the inner surface of the protruding portion 90 so that the thickness of the inclined surface 96 becomes thinner toward the lower direction of the inclined surface 96, so that the thickness thereof is formed thinner than other parts of the magnet 90.

A gap D1 between the top of the magnet 90 and the top of the stator core 42 is formed to be larger than a gap D2 between the bottom of the magnet 90 and the bottom of the stator core 42. This allows the strength of the magnetic field acting on the stator 40 at the top of the magnet 90 to be greater than the strength of the magnetic field acting on the stator 40 at the bottom of the magnet 90 so that the rotor 30 is suppressed from the movement in the upward direction when the rotor 30 is rotated to prevent separation of the rotor 30.

When the protruding portion 94 protrudes at the lower portion of the magnet 90, the length of the magnet 90 becomes larger at the lower portion than at the upper portion, and thus the strength of the magnetic field acting on the stator 40 in the lower portion of the magnet 90 becomes larger than that in the upper portion of the magnet 90. As a result, there is a fear that the rotor 30 is detached from the cooling fan.

In the present invention, an inclined surface 96 in which the thickness of the protruding portion 94 is reduced is formed on the inner surface of the protruding portion 94 so that the lower area of the magnet 90 can be expanded while preventing separation of the rotor 30. That is, the strength of the magnetic field generated by the protruding portion 94 is weakened in the inner direction affecting the stator, and is strengthened in the downward direction detectable by the Hall sensor.

In addition to the inclined surface 96, the inner surface of the protruding portion 94 may be formed in various forms capable of reducing the thickness, such as a stepped form. The outer surface of the protruding portion 94 is exposed without the back yoke 92 so that a magnetic field leaks outwardly of the protruding portion 92, thereby improving the sensing performance of the Hall sensor.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The cooling fans according to the present invention can be usefully applied to apparatuses for preventing overheating of electronic devices, automobiles, LED lightings or the like.

What is claimed is:

1. A cooling fan comprising:
a fan housing;
a rotation shaft which is rotatably supported in the fan housing;
a stator which is fixed to the fan housing;
a rotor, which is provided with a magnet that is disposed with a predetermined gap away from an outer circumferential surface of the stator and a back yoke disposed on an outer circumferential surface of the magnet and that is installed on the rotation shaft; and
a printed circuit board (PCB) which is installed on a lower side of the stator, and is equipped with a circuit component for controlling the cooling fan and a Hall sensor for sensing revolutions of the rotor,
wherein a sensing power enhancement unit for enhancing a sensing power of the Hall sensor is formed in the magnet such that any one of a length and a width at a lower portion of the magnet that is adjacent to the Hall sensor is larger than that of the other portions of the magnet,
wherein the sensing power enhancement unit includes an expansion portion having an increased thickness at the lower portion of the magnet to increase a strength of a magnetic field directed downward, and
wherein the expansion portion protrudes with a same width as a thickness of the back yoke.

2. The cooling fan of claim 1, wherein the circuit component and the Hall sensor are mounted on a same surface of the PCB.

3. The cooling fan of claim 1, wherein the magnet is formed in a cylindrical shape, and the expansion portion protrudes and is formed in a circumferential direction on a lower outer surface of the magnet.

4. The cooling fan of claim 1, wherein the magnet is a plastic magnet.

* * * * *